United States Patent
Ndu et al.

(10) Patent No.: US 12,111,937 B2
(45) Date of Patent: *Oct. 8, 2024

(54) MEMORY SCAN-BASED PROCESS MONITORING

(71) Applicant: Hewlett Packard Enterprise Development LP, Spring, TX (US)

(72) Inventors: Geoffrey Ndu, Bristol (GB); Nigel John Edwards, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,332

(22) Filed: Mar. 21, 2023

(65) Prior Publication Data
US 2023/0222226 A1 Jul. 13, 2023

Related U.S. Application Data

(63) Continuation of application No. 17/118,698, filed on Dec. 11, 2020, now Pat. No. 11,636,214.

(51) Int. Cl.
*G06F 21/54* (2013.01)
*G06F 21/55* (2013.01)
(Continued)

(52) U.S. Cl.
CPC ............ *G06F 21/577* (2013.01); *G06F 21/54* (2013.01); *G06F 21/552* (2013.01);
(Continued)

(58) Field of Classification Search
CPC ............ G06F 2221/034; G06F 21/572; G06F 21/566; G06F 21/552; G06F 21/54; G06F 21/577
(Continued)

(56) References Cited

U.S. PATENT DOCUMENTS 6,918,115 B2 7/2005 Vargas et al.
7,233,877 B2 6/2007 King et al.
(Continued)

FOREIGN PATENT DOCUMENTS

CN 109062718 * 12/2018 ............. G06F 11/07
CN 110046495 A 7/2019
(Continued)

OTHER PUBLICATIONS

Cimpanu et al., "Ransomware installs Gigabyte driver to kill antivirus products", ZD Net, available online at <https://www.zdnet.com/article/ransomware-installs-gigabyte-driver-to-kill-antivirus-products/>, Feb. 7, 2020, 6 pages.
(Continued)

*Primary Examiner* — Josnel Jeudy
(74) *Attorney, Agent, or Firm* — Trop, Pruner & Hu, P.C.

(57) ABSTRACT

A technique includes an operating system agent of a computer system monitoring a process to detect whether an integrity of the process has been compromised. The monitoring includes the operating system agent scanning a data structure. The process executes in a user space, and the data structure is part of an operating system kernel space. The technique includes a hardware controller of the computer system listening for a heartbeat that is generated by the operating system agent. The hardware controller takes a corrective action in response to at least one of the hardware controller detecting an interruption of the heartbeat, or the operating system agent communicating to the hardware controller a security alert for the process.

24 Claims, 11 Drawing Sheets

(51) Int. Cl.
*G06F 21/56* (2013.01)
*G06F 21/57* (2013.01)

(52) U.S. Cl.
CPC .......... *G06F 21/566* (2013.01); *G06F 21/572* (2013.01); *G06F 2221/034* (2013.01)

(58) Field of Classification Search
USPC .......................................................... 726/22
See application file for complete search history.

(56) References Cited

U.S. PATENT DOCUMENTS

| | | | |
|---|---|---|---|
| 7,342,874 | B2 | 3/2008 | Pegrum et al. |
| 8,863,283 | B2 | 10/2014 | Sallam |
| 8,868,790 | B2 | 10/2014 | Lovett et al. |
| 8,949,797 | B2 | 2/2015 | Aaraj et al. |
| 9,800,547 | B2 | 10/2017 | Lee et al. |
| 2006/0143717 | A1* | 6/2006 | Ransome ................ G06F 21/88 726/35 |
| 2009/0106753 | A1* | 4/2009 | Wang ........................ G06F 8/60 717/176 |
| 2013/0312099 | A1 | 11/2013 | Edwards et al. |
| 2013/0333040 | A1 | 12/2013 | Diehl et al. |
| 2014/0032623 | A1 | 1/2014 | Lablans |
| 2017/0078182 | A1 | 3/2017 | Spiegl et al. |
| 2018/0365424 | A1 | 12/2018 | Callaghan et al. |
| 2019/0081983 | A1* | 3/2019 | Teal ....................... G06F 21/602 |
| 2019/0220599 | A1 | 7/2019 | Ndu et al. |
| 2019/0356562 | A1 | 11/2019 | Watkins et al. |
| 2019/0384918 | A1 | 12/2019 | Ndu et al. |
| 2020/0042324 | A1 | 2/2020 | Ayolasomyajula et al. |
| 2020/0183724 | A1* | 6/2020 | Shevade ................ G06F 9/5016 |
| 2020/0327235 | A1 | 10/2020 | Ali et al. |
| 2020/0356380 | A1* | 11/2020 | Kelly ................... G06F 9/44505 |

FOREIGN PATENT DOCUMENTS

| | | | | |
|---|---|---|---|---|
| CN | 110832487 | A | | 2/2020 |
| CN | 114625600 | A * | 6/2022 | .......... G06F 11/3037 |
| EP | 3514720 | A1 | | 7/2019 |
| KR | 101064164 | * | 9/2011 | ............. G06F 12/16 |

OTHER PUBLICATIONS

Cotroneo, D., et al. Adaptive Monitoring in Microkernel Oss (Research Paper); Dependable Systems and Networks Workshops (DSN-W), 2010 International Conference; Aug. 2010, 7 pp.

HPE, "HP Sure Run:Protecting what's critical, continuously", Aug. 2020, 7 pages.

Lambert, Tony , "Trapping the Netwire RAT on Linux", Red Canary, available online at <https://redcanary.com/blog/netwire-remote-access-trojan-on-linux/>, Jan. 29, 2020 , 10 pages.

Madieu, John, "Linux Device Drivers Development", Packt Publishing, 2017, 783 pages.

Microsoft, "Windows Platform Binary Table (WPBT)", Jul. 9, 2015, 12 pages.

Rubini et al., Linux Device Drivers, 2nd Edition, Order No. 0081, Jun. 2001, 574 pages.

Yosifovich et al., "Windows Internals Seventh Edition Part 1 System architecture, processes, threads, memory management, and more", Microsoft, 2017, 1120 pages.

Machine-translation of Description of KR101064164 Patent, downloaded on Apr. 11, 2024, from https://patents.google.com/patent/KR101064164B1/en?oq=kr101064164; 7 pages.

Machine-translation of Description of CN109062718 Patent, downloaded on Oct. 11, 2023, from https://worldwide.espacenet.com/patent/search/family/064816337/publication/CN109062718A?q=cn109062718 under Description tab; European Patent Office; 9 pages.

* cited by examiner

MEMORY SCAN-BASED PROCESS MONITORING

CROSS-REFERENCE TO RELATED APPLICATIONS

This application is a continuation application of and claims priority to application Ser. No. 17/118,698, filed on Dec. 11, 2020, the contents of which are hereby incorporated by reference in their entireties.

BACKGROUND

A computer platform (e.g., a server) may be subject to a security attack in which an external entity seeks to access information that is stored on the computer platform or harm components of the computer platform. For purposes of preventing security attacks or at least inhibiting the degree of harm inflicted by security attacks, the computer platform may have different levels of protection. For example, the computer platform may have various mechanisms to limit access, such as firewalls, passwords, keys, and so forth. As another example, the computer platform may have malware protection software that scans directories, searching for malware agents. As other examples, the computer platform may regularly measure its software components, so that the measurements may be analyzed (e.g., by analysis tools on a remote server) to determine whether tampering has occurred; events (login password failures, website accesses, and so forth) occurring in the computer platform may be monitored using a system information and event management (SIEM) system; and so forth.

DETAILED DESCRIPTION

Figure 1:
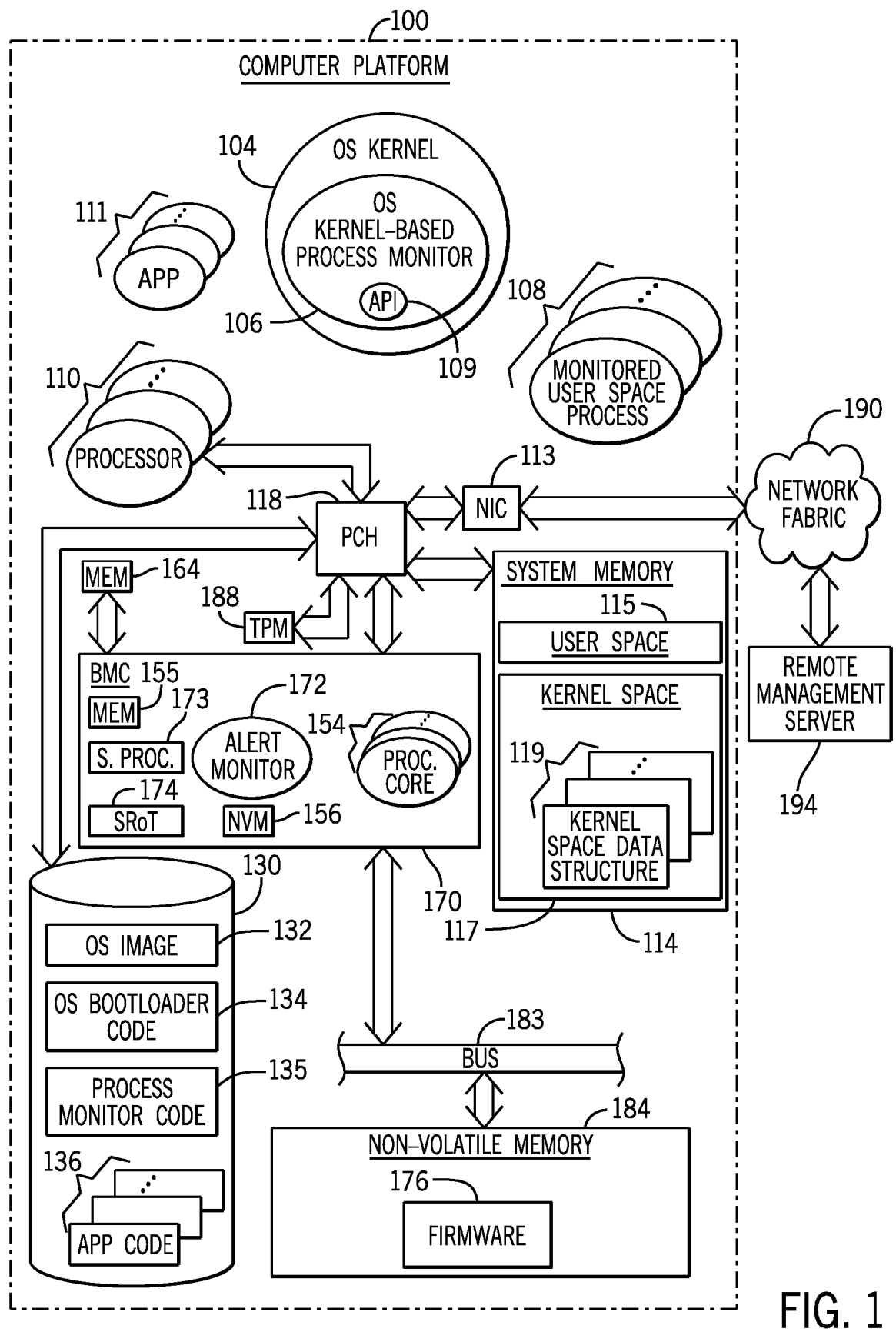
FIG. 1 is a schematic diagram of a computer platform that includes an operating system kernel-based process monitor to monitor the integrities of user space processes according to an example implementation.

A computer platform (e.g., a server, a portable computer, a tablet computer and so forth) may have a wide variety of user space processes, such as user space processes that provide security services for the computer platform. In this context, a "process" refers to an instance of an executing program, such as an instance of an application. A given process may be single-threaded (i.e., corresponds to a single thread) or multithreaded (i.e., corresponds to multiple threads), where a "thread" refers to a unit of executable program instructions. For example, multiple threads may be executed in parallel by multiple processing cores of the computer platform to perform a particular task or set of tasks for the computer platform.

The memory space of the computer platform may be divided into a kernel space and a user space. The "kernel space" refers to the memory space of the computer platform in which the operating system kernel code is stored and executes; and the "user space" refers to the memory space of the computer platform, which is used by non-operating system kernel processes (or "user space processes"), such as application processes. The kernel space has the highest privilege level and cannot be accessed by user space processes. Kernel processes can access both the kernel space and the user space. An instance of an executing malware protection application is an example of a user space process that provides security services for a computer platform. A Linux kernel and a Windows NT kernel are examples of operating system kernels.

Because processes that provide security services for the computer system may be in the user space, these processes may be susceptible to security attacks by malware. In this context, "malware" generally refers to any software that is constructed with the purpose to intentionally damage a computer system (e.g., a single computer platform or a network of computer platforms) and/or extract information from the computer system. Malware exists in a number of different forms, such as viruses, ransomware, worms, Trojan horses, and so forth.

Malware (e.g., Robin Hood ransomware) may halt, or kill, the user space security service-related processes to remain hidden and proceed deeper into an enterprise's computer system. The killing of these security service-related user space processes may be combined with traditional malware-based attacks (e.g., injection attacks, process hollowing attacks, and so forth) for purposes of evading defenses, as well as possibly elevating privileges for malware agents.

In accordance with example implementations that are described herein, a computer system, such as a computer platform, includes an operating system kernel agent, called a "process monitor," which monitors user space processes (e.g., processes that provide security services) for purposes of detecting whether the integrities of these processes have been compromised. In accordance with example implementations, the process monitor scans kernel space data structures (e.g., virtual memory areas (VMAs)) that contain information about corresponding parts of a monitored user process's address space. By monitoring the kernel space data structures, the process monitor is able to detect a particular state of the process's memory state, which is consistent with the integrity of the process being compromised. For example, the process monitor may detect a process memory state that indicates that the monitored process has undergone process hollowing or indicates that code has been injected into the process.

Because the process monitor is part of the operating system kernel and the monitored data structures are within the kernel space, the monitoring of the user space processes is highly resistant to tampering. In accordance with example implementations, to further harden the monitoring by the process monitor against a potentially powerful adversary, the monitoring is enhanced by hardware of the computer platform. More specifically, in accordance with some implementations, the process monitor generates a heartbeat; and a hardware controller (e.g., a baseboard management controller) of the computer platform listens for the heartbeat. If the hardware controller detects an interrupt of the heartbeat, the hardware controller may assume that the integrity of the operating system kernel (and process monitor) has been compromised and proceed to take remedial, or corrective, action. As described further herein, the corrective action(s) may include shutting down the computer platform, rebooting the computer platform, notifying a remote management server, and so forth. In this context, a "heartbeat" refers to a repeating sequence of signals, pings, or indications, such as messages, which follow a particular schedule (e.g., a periodic schedule) to represent that the entity that sends or generates the heartbeat is operating in an acceptable state. Consequently, the interruption of the heartbeat (e.g., a missed signal, ping, or indication of the heartbeat) corresponds to the entity not operating in an acceptable state.

In accordance with example implementations, the hardware controller receives an alert from the process monitor, should the process monitor detect a memory state of a monitored user space process, which is consistent with the integrity of the process being compromised. The hardware controller may take corrective action (e.g., shutting down the computer platform, rebooting the computer platform, alerting a remote management server, and so forth) in response to such an alert.

As described further herein, in accordance with example implementations, the process monitor may listen for the heartbeat of a monitored user space process, so that if the user space process stops functioning (e.g., stops functioning due to malware killing the process), then this event may be detected by the process monitor via the detected absence of the heartbeat. Therefore, in accordance with some implementations, there may be a hierarchy of heartbeats for the monitored user space processes: a first hierarchical level of heartbeats sent by monitored processes, which may be used to detect tampering with the processes; and a second hierarchical level that includes a heartbeat sent by the process monitor, which may be used to detect tampering with the process monitor (and consequently, tampering with the operating system kernel). As also further described herein, in accordance with some implementations, the sending of a heartbeat (and the corresponding monitoring of the heartbeat) by a given monitored user space process may be optional, thereby allowing the memory scanning-based monitoring to still be used for a legacy user space process that does not support generating a heartbeat.

Referring to FIG. 1, as a more specific example, in accordance with some implementations, a computer platform 100 may have include one or multiple processors 110 (e.g., one or multiple central processing units (CPUs), one or multiple CPU processing cores, and so forth); and a system memory 114. The system memory 114 and other memories discussed herein are non-transitory storage media that may be formed from semiconductor storage devices, memristor-based storage devices, magnetic storage devices, phase change memory devices, a combination of devices of one or more of these storage technologies, and so forth. The system memory 114 may represent a collection of memories of both volatile memory devices and non-volatile memory devices.

In accordance with example implementations, the memory locations of the system memory 114 include a user space 115 and a kernel space 117. The kernel space 117 represents memory locations of the system memory 114 in which the operating system kernel code corresponding to an operating system kernel 104 is stored and executes; and the user space 115 refers to the memory space of the system memory 114, which is used by the non-operating system kernel processes (or "user space processes"), such as processes that correspond to executing instances of applications 111. As described further herein, a given user space process may be a monitored user space process 108 (also called a "monitored process 108" or a "process 108" herein).

The computer platform 100 is just one example of a number of different potential architectures in accordance with the many possible implementations. In general, regardless of its particular architecture, the computer platform is a processor-based electronic device, which has an operating system that has an associated kernel space and user space. As examples, the computer platform 100 may be a stand-alone server, a rack-mounted server module; an edge processing, rack-mounted module; a server blade; a blade enclosure containing one or multiple server blades; a client; a thin client; a desktop computer; a portable computer; a laptop computer; a notebook computer; a tablet computer; a smartphone; a wearable computer; and so forth.

In accordance with example implementations, the computer platform 100 includes a kernel space operating system agent, called a "process monitor 106" (also called an "operating system kernel-based process monitor 106" herein), which may monitor one of multiple user space processes 108 for purposes of detecting or determining whether the integrities of the processes 108 have been compromised (i.e., for purposes of detecting whether tampering has occurred). In accordance with example implementations, the process monitor 106 may be an extension of the operating system kernel 104, such as, for example, a loadable kernel module (LKM) for a Linux operating system that corresponds to code 135 loaded during the installation of the operating system; and after the installation of the operating system, the process monitor 106 becomes part of the operating system kernel 104.

As further described herein, in accordance with example implementations, the process monitor 106 provides an application programming interface (API) 109, which allows an application 111 to register a user space process that corresponds to an instance of the application 111, so that, when registered, the process becomes a registered user space process 108 that is monitored by the process monitor 106.

In accordance with some implementations, the API 109 may provide a register( ) function, which is invoked to register a process (to become a corresponding monitored process 108) and among other parameters, receives a process identification (ID) for the process. The API 109 may also provide a ping( ) function, which may be invoked to select an optional monitoring of a heartbeat from the process 108. Among other parameters, the ping( ) function may receive a parameter that represents a timeout period for the heartbeat. The API 109 may also provide an unregister( ) function, which is used to unregister the process as being a monitored process 108. It is noted that the monitoring of a heartbeat of a monitored process 108 may, in accordance with example implementations, be optional, to accommodate the incapability of a legacy process to generate the heartbeat.

Figure 2:
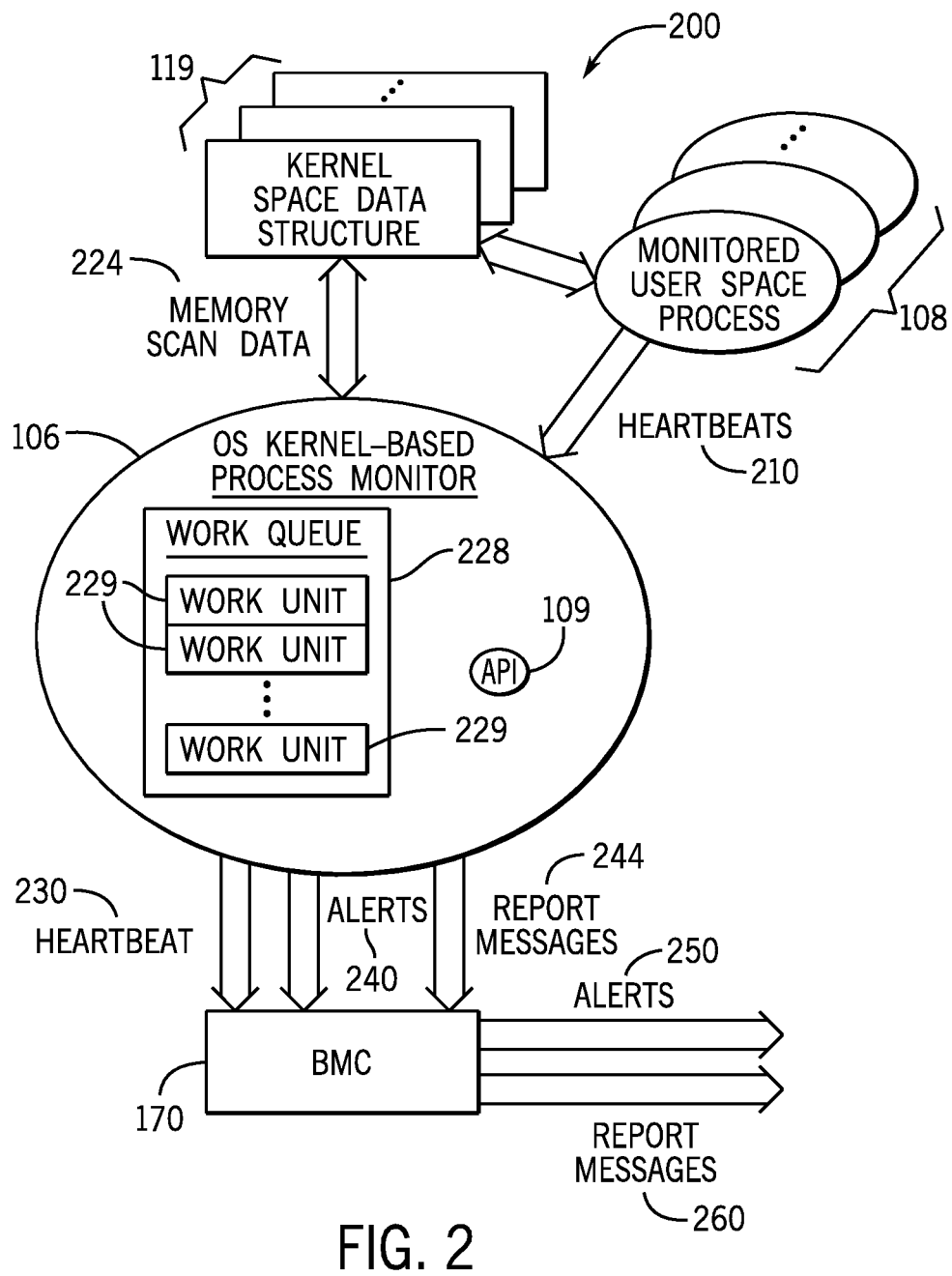
FIG. 2 is an illustration of process monitoring by the process monitor of FIG. 1, including the enhancement of the process monitoring by a baseboard management controller of the computer platform according to an example implementation.

FIG. 2 is an illustration 200 of the monitoring of processes 108 by the process monitor 106 in accordance with example implementations. Referring to FIG. 2 in conjunction with FIG. 1, the process monitor 106, in accordance with example implementations, scans a portion of the kernel space 117 that is associated with the monitored user space process 108 to acquire corresponding memory scan data 224. More specifically, in accordance with some implementations, the process monitor 106 may regularly scan one or multiple operating system kernel space data structures 119 (also called "kernel space data structures 119" and "data structures 119" herein) that describe respective user space memory regions (e.g., virtual memory regions) of the monitored process 108. The kernel space data structures 119 are used by the operating system kernel 104 to track and manage the user memory space of the monitored process 108. For example, the operating system kernel 104 may use the data structures 119 to manage page reclaiming, copy-on-writes (COWs), memory mapping of files, demand paging, and so forth. In accordance with example implementations, the monitored process 108 may have multiple kernel space data structures 119, where each kernel space data structure 119 corresponds to a different contiguous virtual memory space of the process 108, and the contiguous virtual memory space shares properties in common.

As an example, in accordance with some implementations, for a Linux operating system, the kernel data structure 119 may be a virtual memory area (VMA) that contains pointers to the start and end virtual addresses of a corresponding contiguous segment of virtual memory; flags representing whether respective pages are read only; flags representing whether respective pages are dirty; flags representing whether respective pages are executable; data representing a backing store resource; data representing reverse mapping structures; and so forth. A given user space monitored process 108 may, in accordance with example implementations, have multiple VMAs, such as one VMA for the corresponding program code, another VMA for each type of data, a VMA for each distinct memory mapping, and so forth.

In accordance with example implementations, the process monitor 106 may scan the kernel space data structure(s) 119 for a particular monitored user space process 108 from time to time (e.g., scanning at periodic intervals, continual scanning and rescanning, scanning at intervals according to a predefined schedule, and so forth) to determine, based on the observed data stored in the data structure(s) 119, whether the monitored user space process 108 has a certain memory state that indicates, or represents, that the integrity of the process 108 has been compromised. This determination may involve determining (as described further below in connection with FIG. 3) whether the monitored user space process 108 has any shared library objects (called "suspicious library objects" herein) that indicate attempt(s) to load a malicious library in the context of a process; and/or the determination may involve determining (as described further below in connection with FIG. 4) whether the monitored user space process 108 has any copy-on-write (COW) executable pages, which would be consistent with malicious code injection.

Still referring to FIG. 2 in conjunction with FIG. 1, in the event that the scanning of a process's kernel space data structure(s) 119 reveals a memory state that indicates, or represents, integrity compromise of the process 108, then, in accordance with example implementations, the process monitor 106 sends an alert 240 (e.g., a message) to a hardware controller of the computer platform, such as the baseboard management controller 170. In general, the alert 240 identifies a particular monitored user space process 108; and represents a particular integrity compromise problem for the process 108, which has been detected, or determined, by the process monitor 106.

In accordance with example implementations, the sending of alerts 240 to hardware, such as the baseboard management controller 170, further hardens the process monitoring and reporting against being compromised by a malware agent. As described further herein, in accordance with some implementations, the baseboard management controller 170 may contain a silicon root of trust (SRoT) for the computer platform 100; and as such, the baseboard management controller 170 serves as a highly trusted entity to send a corresponding alert 250 (e.g., a message) to the remote management server 194 in response to an alert 240. In accordance with example implementations, similar to the alert 240, the alert 250 may, for example, contain an identifier for the user space monitor process 108 at issue, along with other information representing details about the nature of the integrity compromise detected by the process monitor 106. As further described herein, a given alert 250 may also be used to communicate to a remote management server 194 that the operating system kernel 104 has been compromised.

The baseboard management controller 170, in response to receiving an alert 240 from the process monitor 106, may take additional and/or different corrective, or remedial, actions (other than sending the alert 250), depending on the particular implementation. For example, in accordance with some implementations, the baseboard management controller 170 may power down the computer platform 100 in response to receiving an alert 240, and require a password, key or other credential (e.g., a credential supplied via a remote management server 194) before allowing the computer platform 100 to reboot. As another example, in accordance with some implementations, the baseboard management controller 170 may reboot (i.e., perform a power on reset) the computer platform 100 in response to receiving an alert 240. In accordance with some implementations, the particular remedial action(s) that are taken by the baseboard management controller 170 may be based on a predefined user policy.

As also depicted in FIG. 2, in accordance with some implementations, the process monitor 106 may send a heartbeat 230 to the baseboard management controller 170. As an example, the heartbeat 230 may correspond to a sequence of messages (e.g., Peripheral Component Interconnect express (PCIe) messages), where each message corresponds to a particular heartbeat indication, or ping, of the heartbeat 230. The baseboard management controller 170 listens for the heartbeat 230 so that should the heartbeat 230 be interrupted (e.g., the baseboard management controller 170 fails to receive a heartbeat indication, or ping, within a particular time out period), then the baseboard management controller 170 may, in accordance with example implementations, send a corresponding alert 250 to the remote management server 194 and/or take additional or different remedial actions, according to a predefined user policy.

By listening for the heartbeat 230, the baseboard management controller 170 may detect whether the integrity of the process monitor 106 and consequently, the integrity of the operating system kernel 104, have been compromised. This protects the process monitoring from a relatively powerful adversary that might potentially tamper with the operating system kernel 104 and might otherwise (if not for the heartbeat 230 mechanism) disable the monitoring by the process monitor 106 without knowledge of this disablement being detectable by the baseboard management controller 170. It is noted that, in accordance with example implementations, the computer platform 100 may employ one or multiple additional measures (i.e., measures in addition to monitoring the heartbeat 230) for purposes of determining or detecting whether the integrity of the operating system kernel 104 has been compromised. For example, in accordance with some implementations, the baseboard management controller 170 may contain a scanning engine (e.g., an engine formed from hardware, machine executable instructions or a combination thereof), such as the scanning engine that is described in U.S. Patent Application Publication Number 2019/0384918, which may scan kernel data structures, kernel code and loadable kernel modules (such as the process monitor 106) for purposes of ensuring that the operating system kernel 104 and its extensions have not changed. The scanning engine is an example, as the computer platform 100 may contain one or multiple different and/or additional mechanisms to monitor the integrity of the operating system kernel 104, in accordance with further implementations.

The baseboard management controller 170 may communicate process monitoring information other than the alerts 250 to a remote management server 194. For example, as illustrated in FIG. 2, in accordance with some implementations, the process monitor 106 may send non-alert, report messages 244 to the baseboard management controller 170, which contain data about results of the memory scanning; and the baseboard management controller 170 may compile the data and send corresponding report messages 260 to the remote management server 194, reporting the results.

For example, in accordance with some implementations, the process monitor 106 may send a report message 244 to the baseboard management controller 170, which contains data that represents the shared library objects for a particular monitored user space process 108 found as a result of the scanning of the corresponding kernel space data structures 119. The report message 244 may also contain the corresponding file paths of the shared library objects. By reporting (via the report messages 260) the shared library objects and file paths to the remote management server 194, security verification tools on the server 194 (or other entity) may, for example, compare the file paths of the shared library objects to the file paths that are recorded in an Integrity Measurement Architecture (IMA) log for the computer platform 100. File path discrepancies identified in the comparison may, for example, reveal that the integrities of certain software components of the computer platform 100 have been compromised.

As another example, in accordance with some implementations, the computer platform 100 may be one of a fleet of servers; the data from memory scanning reports that are provided by the servers of the fleet may be statistically analyzed (e.g., analyzed by tools on a remote management server 194 or other component); and an alert for a given server of the fleet may be generated in response to a statistic of the given server being an outlier with respect corresponding statistics from the remainder of the fleet.

FIG. 2 also depicts the process monitor 106 monitoring heartbeats 210 that are generated by respective monitored user space processes 108. In accordance with example implementations, an application 111 (FIG. 1) may, via the API 109, select heartbeat monitoring for a particular monitored user space process 108, along with a specific time out period for the heartbeat 210. If the process monitor 106 detects an interruption of the heartbeat 210 (i.e., does not detect a heartbeat indication, or ping, within the time out period for the heartbeat 210), then the process monitor 106 may send a corresponding alert 240 to the baseboard management controller 170 so that the controller 170 may then take the appropriate remedial, or corrective, action (e.g., reboot, communicate an alert 250 to a remote management server 194, and so forth). It is noted that, in accordance with example implementations, the heartbeat monitoring for the monitored user space processes 108 is optional, which allows, for example, a legacy user space process 108 to have its memory scanned by the process monitor 106, while foregoing heartbeat monitoring for the process 108.

In accordance with some implementations, the API 109 may be a socket-style API, such as a Netlink API for the Linux operating system. A socket-style API may, in general, be easier to use than, for example, an API implemented using non-standard system calls or mechanisms based on input/output control (ioclt) system calls for the Linux operating system. In accordance with example implementations, the user space process 108 may bind to a socket, which allows the process 108 to be verified by the process monitor 106. After the process passes verification, the process monitor 106 may then perform the scanning of kernel space data structures 119 associated with the process 108, as well as monitor the heartbeat 210 from the process (if this option is selected).

In accordance with some implementations, the computer platform 100 does not provide any additional mechanism to protect against spoofing of the heartbeats 210, as a socket messaging system, such as Netlink, provides sufficient contextual information for authentication of the heartbeat 210. In this regard, the user space process 108 sends its respective process ID, which the process monitor 106 may use to securely identify the source of the heartbeat 210. Moreover, the socket messaging system, in accordance with example implementations, supports duplex communications, allowing the process monitor 106 to message a user space process 108 to request further information from the process 108 to verify the source of the heartbeat 210.

In accordance with further implementations, the API 109 may not be a socket-style API and may be invoked using system calls.

The functions of the process monitor 106 may be implemented using a work queue 228 (e.g., a Linux work queue). In general, a scheduler of the process monitor 106 may provide work units 229 to the work queue 228, where each work unit 229 may represent a particular task or function to be performed by a corresponding kernel thread. In general, the use of the work queue 228 allows a multithreaded approach to performing the functions of the process monitor 106. As examples, these functions may include registering a user space process 108 for memory scan monitoring; registering a user space process 108 for heartbeat 210 monitoring; performing a memory scan of data structures 119 corresponding to a user space process 108; listening for a heartbeat 210 from a user space process 108; generating pings (e.g., messages) for the heartbeat 230; regulating the sending of alerts 240 to the baseboard management controller 170; sending report messages 244 to the baseboard management controller 170; unregistering a user space process 108 from being monitored; and so forth.

Referring back to FIG. 1, in accordance with example implementations, in addition to the processor(s) 110, system memory 114 and baseboard management controller 170, the computer platform 100 may have various other hardware components, such as an input/output (I/O) bridge, or platform controller hub (PCH) 118; one or multiple mass storage devices 130; a non-volatile memory 184 (e.g., a flash memory) that stores firmware 176; one or multiple network interface cards (NICs) 113; a trusted platform module (TPM) 188; I/O devices (e.g., a keyboard, mouse, a trackpad, a display, and so forth); PCIe option cards; and so forth.

The baseboard management controller 170, the NIC(s) 113, the TPM 188 and the processors 110 may, in accordance with example implementations, communicate through the PCH 118; and the storage device(s) 130 may be coupled to the processors 110 through the PCH 118. As depicted in FIG. 1, in accordance with some implementations, the storage device(s) 130 may store an operating system image 132 (corresponding to an operating system), operating system bootloader code 134 (corresponding to an operating system bootloader), process monitor code 135 (corresponding to the process monitor 106); and application code 136 (corresponding to the applications 111). For the example implementation of FIG. 1, a NIC 113 couples the PCH 118 to network fabric 190 for purposes of allowing the baseboard management controller 170 to communicate with a management network, including the depicted remote management server 194. In accordance with further example implementations, the baseboard management controller 170 may contain a network interface controller that communicates with the network fabric 190.

In general, the network fabric 190 may be associated with one or multiple types of communication networks, such as (as examples) Fibre Channel networks, iSCSI networks, ATA over Ethernet (AoE) networks, HyperSCSI networks, Gen-Z fabrics, dedicated management networks, local area networks (LANs), wide area networks (WANs), global networks (e.g., the Internet), wireless networks, or any combination thereof.

The TPM 188 is an example of a security component of the computer platform 100, which has a secure memory that may be used to store secure information (e.g., the secure boot variables, hashes to verify integrity measurement, keys, and so forth) for the computer platform 100. Examples of TPMs that may be used are commercially available from such vendors as Infineon Technologies, Nuvoton and STMicroelectronics. In accordance with further example implementations, the computer platform 100 may contain a security component other than a TPM. Moreover, in accordance with further implementations, the TPM may be a virtual TPM (vTPM). As such, depending on the particular implementation, the TPM may be implemented in firmware, software or hardware. In accordance with further implementations, the computer platform 100 may not include a TPM.

In accordance with example implementations, the baseboard management controller 170 may be an embedded system that is mounted to a motherboard of the platform 100. Depending on the particular implementation, the baseboard management controller 170 may contain one or multiple semiconductor packages (or "chips") and one or multiple semiconductor die. In accordance with further implementations, the baseboard management controller 170 may be an expansion card that is connected to a connector slot disposed on the motherboard. The baseboard management controller 170 may not contain semiconductor package(s) mounted to the motherboard or be located on an expansion card, in accordance with further implementations. Regardless of its particular form or implementation, the baseboard management controller 170, in general, may include one or multiple general purpose embedded processing cores 154 (e.g., CPU processing cores), which may execute machine executable instructions to provide an alert monitor 172 for the baseboard management controller 170. In general, as further described herein, the alert monitor 172 may perform various functions related to the process monitoring that is described herein, such as listening for the heartbeat 230 (FIG. 2); authenticating messages corresponding to heartbeat indications, or pings, of the heartbeat 230; responding to a detected interruption of the heartbeat 230; taking corrective, or remedial, actions in response to the failure to detect the heartbeat 230; receiving alerts 240 from the process monitor 106; taking corrective, or remedial, actions in response to the alerts 240; sending alerts 250 to a remote management server 194; receiving report messages 244 from the process monitor 106; sending report messages 260 to a remote management server 194; and so forth.

As used herein, a "baseboard management controller" is a specialized service processor that monitors the physical state of a server or other hardware using sensors and communicates with a management system through a management network. The baseboard management controller 170 may communicate with applications executing at the operating system level through an input/output controller (IOCTL) interface driver, a representational state transfer (REST) application program interface (API), or some other system software proxy that facilitates communication between the baseboard management controller 170 and applications. The baseboard management controller 170 may have hardware level access to hardware devices located in a server chassis including system memory. The baseboard management controller 170 may be able to directly modify the hardware devices. The baseboard management controller 170 may operate independently of the operating system of the computer platform 100. The baseboard management controller 170 may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. As such, the baseboard management controller 170 is separate from the processor(s) 110, which execute the high-level operating system for the computer platform 100.

In accordance with example implementations, the baseboard management controller 170 may have a management plane and a separate, security plane. Through its management plane, the baseboard management controller 170 may provide various management services for the computer platform 100. In addition to actions described herein pertaining to monitoring integrities of the processes 108 and operating system kernel 104, the baseboard management controller 170 may provide various other management services, such as monitoring sensors (e.g., temperature sensors, cooling fan speed sensors); monitoring operating system status; monitoring power statuses; logging computer platform 100 events; providing remotely controlled management functions for the computer platform 100; and so forth. Through its security plane, the baseboard management controller 170, in accordance with example implementations, provides security functions, or services, for the computer platform 100, such as key management (e.g., functions relating to storing and loading cryptographic keys), firmware image validation, platform cryptographic identity retrieval, measurement hash loading, measurement hash retrieval, and so forth.

As described further herein, in accordance with some implementations, the baseboard management controller 170 may, as part of its security plane, store a seed or a key, which the baseboard management controller 170 may use to authenticate messages that correspond to pings of the heartbeat 230 (FIG. 2). The authentication of the heartbeat messages is a security measure to prevent a powerful adversary spoofing the heartbeat messages. As also described further herein, the baseboard management controller 170 may communicate the seed or key to the process monitor 106 as part of the boot up, or power up, of the computer platform 100; and the processor monitor 106 may use the seed or key to generate messages that correspond to pings of the heartbeat 230.

The security plane of the baseboard management controller 170, in accordance with example implementations, is formed by a secure enclave of the controller 170, which may include a security processor 173 (e.g., a CPU processing core); a non-volatile memory 156 (e.g., a memory to store cryptographic keys, a cryptographic identity, seeds, and so forth); a volatile memory 155 (e.g., a memory to store firmware that is loaded into the volatile memory 155 and executed by the security processor 173); a secure bridge (not shown) to control access into the secure enclave and control outgoing communications from the secure enclave; cryptographic-related peripherals (not shown), such as cryptographic accelerators, a random number generator, a tamper detection circuit, and so forth; and a hardware or "silicon" Root of Trust (RoT) engine, called the "SRoT engine 174" herein. In accordance with example implementations, the SRoT engine 174 validates firmware to be executed by the security processor 173 before the SRoT engine 174 loads the firmware into the secure enclave's volatile memory 155 and allows the security processor 173 to execute the firmware.

As mentioned above, the baseboard management controller 170 includes general purpose processing cores 154. The processing core(s) 154 execute firmware instructions from a non-volatile memory 164 to provide various management services for the controller 170 as part of the controller's management plane. As part of the management services, the general purpose processing core(s) 154 may execute firmware instructions to provide the alert monitor 172.

In accordance with example implementations, the baseboard management controller 170 may validate firmware 176, which may, for example, correspond to machine executable instructions and data executed by the computer platform 100 for purpose of providing a variety of different functions for the platform 100. For example, the firmware 176 may contain a boot code image executed by a designated boot processor 110 to boot up the computer platform 100; machine executable instructions corresponding to a management stack executed by the baseboard management controller 170 to provide a wide variety of different management services for the computer platform 100; machine executable instructions executed by the security processor 173 to provide various security services for the computer platform 100; and so forth. In accordance with example implementations, the firmware 176 may be stored in the non-volatile memory 184; and the baseboard management controller 170 may communicate with the non-volatile memory 184 via a bus 183 (e.g., a serial peripheral interface (SPI) bus). In accordance with further example implementations, the baseboard management controller 170 may not validate the firmware 176, and validation may be provided by a separate security semiconductor package disposed, for example, between the baseboard management controller 170 and the non-volatile memory 184.

For example implementations in which the baseboard management controller 170 validates the firmware 176, in general, in response to a power on reset of the computer platform 100, the baseboard management controller 170 holds the general purpose processing core(s) 154 of the controller 170 in reset. After performing initial root of trust security checks as well as other checks (e.g., hardware fault checks), the baseboard management controller 170 releases the general purpose processing core(s) 154 from reset.

In accordance with example implementations, the baseboard management controller 170 stores an immutable fingerprint, which is used by the SRoT engine 174 to validate machine executable instructions. More specifically, in accordance with example implementations, in response to the power on reset, the SRoT engine 174 validates and then loads an initial portion of the firmware 176 (initially stored in the non-volatile memory 184) into the memory 155 so that this firmware portion is now trusted. The security processor 173 is allowed to boot and execute the loaded firmware instructions. By executing the firmware instructions, the security processor 173 may then validate another portion of the firmware 176, which corresponds to a portion of the baseboard management controller's management firmware stack; and after this validation, the security processor 173 may then load this portion of the firmware 176 into the memory 155 before the memory 155 is locked to prevent further modification. The security processor 173 may also, in accordance with example implementations, validate another portion of the firmware 176, which corresponds to the boot image; and after validation, the boot image may be loaded into the system memory 114, so that a boot processor 110 may execute instructions of the image to boot the computer platform 100. The boot of the computer platform 100 may be a secure boot (e.g., a Unified Extensible Firmware Interface (UEFI) secure boot) or a non-secure boot, depending on the particular implementation. The boot concludes with the loading of the operating system bootloader code 134 and the transfer of control of the computer platform 100 to the operating system.

Referring back to FIG. 2, in accordance with example implementations, the scanning of the kernel space data structures 119 by the process monitor 106 detects run-time shared library object code injection. This shared library object code injection may be the result of using dynamic loaded functions to load malicious shared library objects, as well as load time shared library code injection, where an adversary uses environment variables (e.g., an environment variable LD_PRELOAD) and system files (e.g., "/etc/ld.so.preload") to load malicious shared objects. In general, the memory scanning by the process monitor 106 may also detect surgical process code injection in which an adversary injects code into the process 108 without disturbing the part of the process memory that pertains to sending the heartbeat 210.

In accordance with example implementations, the process monitor 106 walks kernel space data structures 119 that correspond to the monitored process 108 to search for suspicious shared library objects. As examples, a shared library object may be a memory allocated shared library object; a deleted shared library object; a shared library object outside of traditional operating system directories; a shared objects with memory file directories; and so forth. In this context, a "suspicious" shared library object refers to a shared library object that has an associated file path, which, in combination with the type, or category, of the shared library object, is consistent with the object being affiliated with malware.

Figure 3:
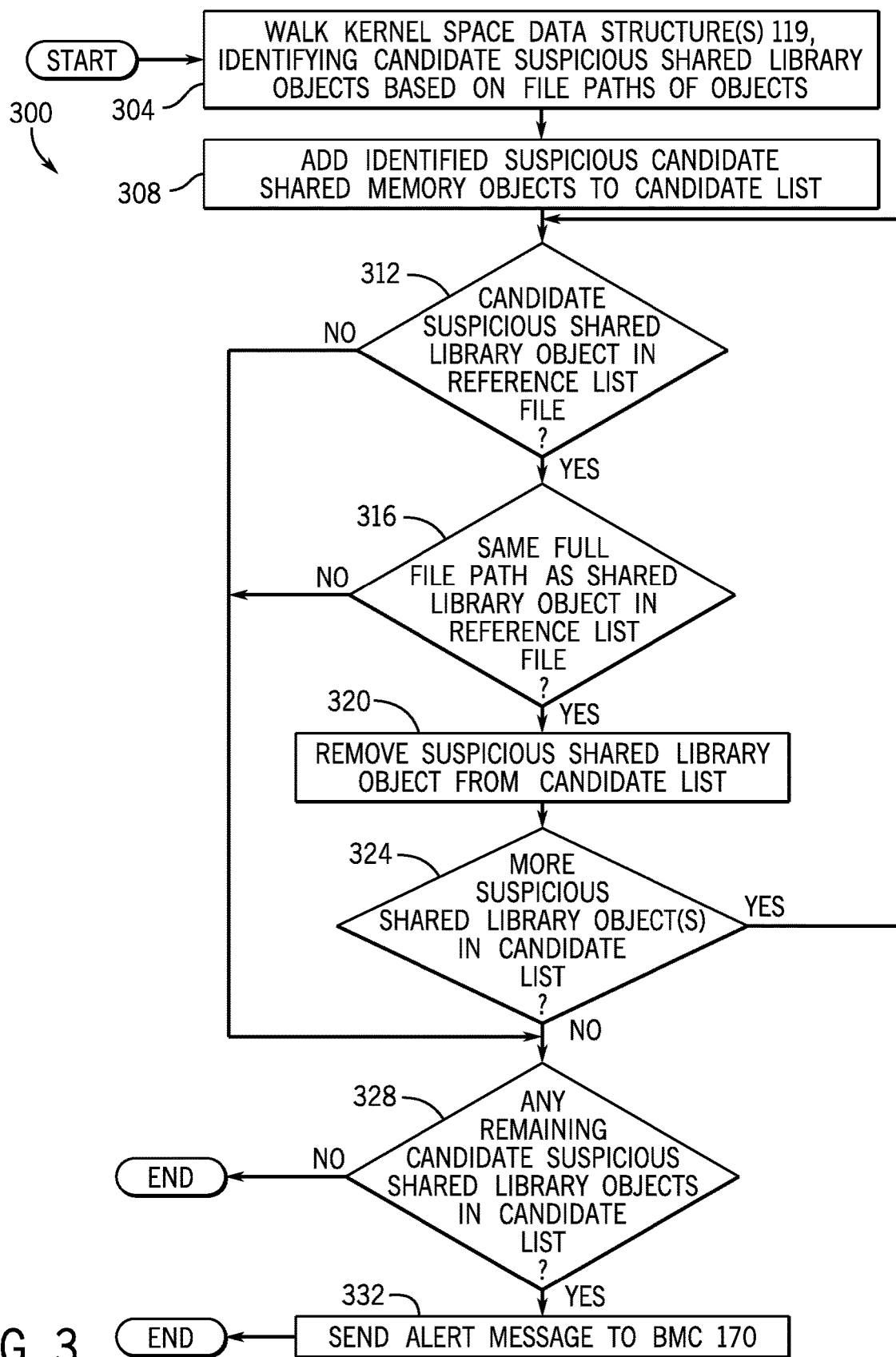
FIG. 3 is a flow diagram depicting the scanning of a kernel space-based data structure of a user space process to search for suspicious shared library objects according to an example implementation.

More specifically, referring to FIG. 3 in conjunction with FIG. 2, in accordance with example implementations, the process monitor 106 may perform a technique 300 to scan the kernel space data structure(s) 119 for a particular monitored user space process 108 for suspicious shared library objects. Pursuant to block 304, the process monitor 106 walks the data structure(s) 119, identifying candidate suspicious shared library objects based on the file paths of the shared library objects. For example, the shared library objects may be located in a temporary directory, located in a user home directory, and so forth. The process monitor 106 may, pursuant to block 308, add the identified suspicious candidate shared library objects to a candidate list.

The process monitor 106 may then, as depicted in blocks 312 to 324 of FIG. 3, begin an iterative process to evaluate each candidate suspicious shared library object. As part of this iterative process, the process monitor 106 determines, pursuant to decision block 312, whether the candidate suspicious shared library object is in a reference list file. In accordance with example implementations, the reference list file contains approved shared library objects and their corresponding full file paths. Depending on the particular implementation, the reference list file may be populated with information supplied by experts, references supplied by information gathered as part of the process monitoring, and so forth. Moreover, entries in the reference list file may be removed and added, as appropriate, as information is learned over time about malware agents and their corresponding behaviors. In accordance with some implementations, one or multiple applications 111 (FIG. 1) may be run on a separate security computer system; shared library objects and corresponding file paths may be observed on the separate security computer system; and a reference list file may then be populated with the observed shared library objects and corresponding file paths for use on another computer platform, such as the computer platform 100. If, pursuant to decision block 316, the process monitor 106 determines that the corresponding shared library object in the reference list file has the same full file path as the candidate suspicious shared library object, then, pursuant to block 320, the process monitor 106 removes the candidate suspicious shared library object from the candidate list. If there are more candidate suspicious shared library objects in the candidate list to evaluate, then, pursuant to decision block 324, control returns to decision block 312 to perform another iteration.

After the candidate suspicious shared library objects have been evaluated, then, pursuant to decision block 328, the process monitor 106 determines whether there are any candidate suspicious shared library objects remaining in the candidate list. If so, then, pursuant to block 332, the process monitor sends an alert message (i.e., an alert 240) to the baseboard management controller 170. In accordance with example implementations, the alert message may, for example, identify the corresponding monitored user space process 108, the shared library objects at issue, the file paths of these shared library objects, timestamps corresponding to the times at which the discoveries were made, and so forth.

In accordance with example implementations, the process monitor 106 may scan the kernel space data structures 119 for purposes of identifying any COW executable pages. In general, executable pages of shared library objects are immutable, i.e., have read only statuses and are shared by the operating system kernel 104 across all of the processes. Therefore, in accordance with example implementations, COW executable pages are used to identify behavior consistent with malware, as an untampered process should not have a shared library object with a COW executable page, i.e., a page with private changes. Injecting code with ptrace and other tools triggers COW as the operating system kernel 104 ensures that changes are not visible to other processes mapping the same shared library object file and are not written back to the underlying file. As such, the approach used by the process monitor 106 detects code injection without the use of measurements and does not rely on the actual content of user space memory pages, which may be, for example, encrypted.

For purposes of preventing malware from becoming persistent, the operating system may map all executable pages of a native binary backed by a file as being "private" and read only. Here, "private" means that updates are not visible to other processes mapping the same file and are not written back to the underlying file. This implies that injecting code into the executable pages of a file backed binary effectively triggers a COW. Therefore, the memory scanning by the process monitor 106, in accordance with example implementations, detects code injected in ways other than via shared library objects.

Figure 4:
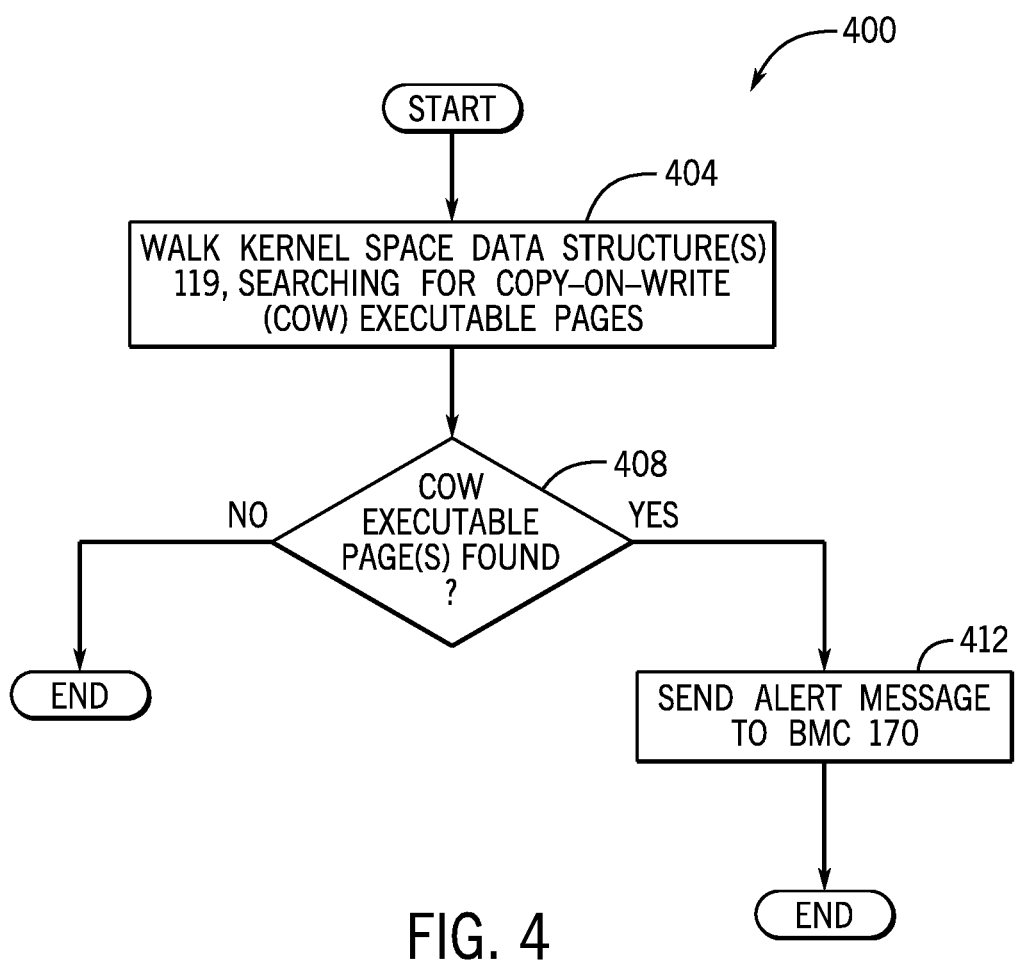
FIG. 4 is a flow diagram depicting a scanning of a kernel space-based data structure of a user space process to search for copy on write (COW) executable pages according to an example implementation.

Referring to FIG. 4 in conjunction with FIG. 2, in accordance with example implementations, the process monitor 106 may perform a technique 400 to scan the kernel data structure(s) 119 for an associated user space monitored process 108 for purposes of identifying COW executable page(s) and generating an alert in response thereto. More specifically, pursuant to the technique 400, the process monitor 106 may walk (block 404) the data structures 119, searching for COW executable pages. For example, for a Linux operating system in which the data structures 119 are VMAs, the process monitor 106 may identify a COW executable page, if a VMA for the monitored user space process 108 has the following flags for the page: an R flag being set equal to "1," indicating that the page is read only; a D flag being set equal to "1," indicating that the page is dirty; and an E flag being set equal to "1," indicating that the page is executable. If, pursuant to decision block 408, any COW executable pages are found, then, the process monitor 106 sends an alert message (i.e., an alert 240) to the baseboard management controller 170, pursuant to block 412. In accordance with example implementations, this message may contain an identifier for the process 108, information for the identified COW executable page(s) found, timestamps corresponding to the times of the discoveries, and so forth.

Figure 7:
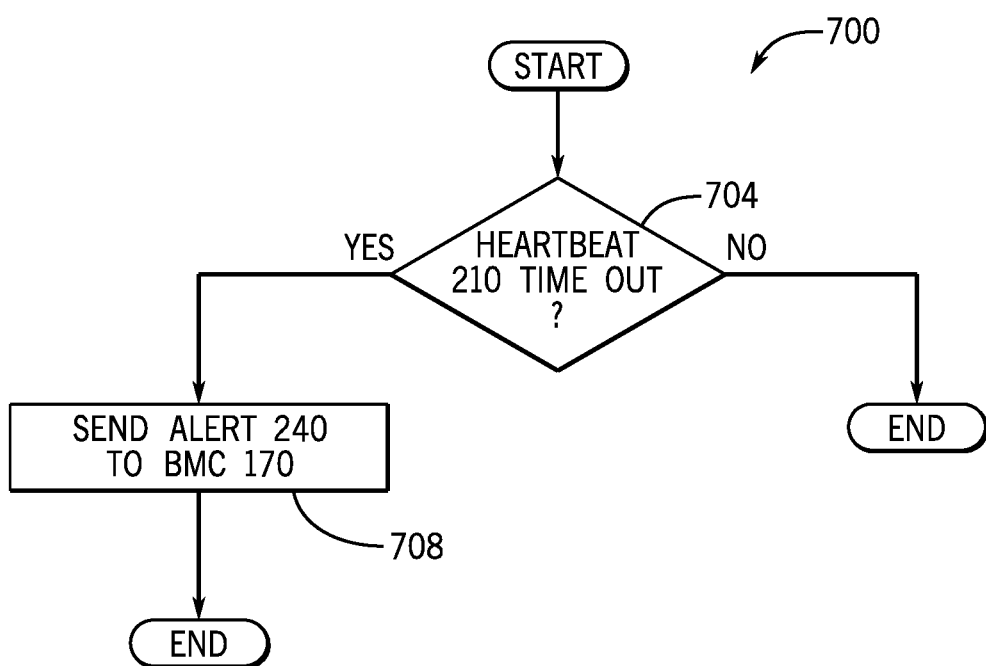
FIG. 7 is a flow diagram depicting a heartbeat monitoring technique used by the process monitor according to an example implementation.

FIG. 7 depicts an example technique 700 that may be, for example, triggered periodically for purposes of the process monitor 106 checking whether a timeout of the heartbeat 210 for a particular monitored user process 108 has occurred. As such, pursuant to decision block 704, the process monitor 106 determines whether a heartbeat timeout has occurred; and if so, then, pursuant to block 708, the process monitor 106 sends an alert message to the baseboard management controller 170. As an example, the alert 240 may correspond to a message that may contain, as an example, information identifying the particular monitored user space process 108 for which the heartbeat time out occurred, a timestamp representing a time at which the time out was detected, and so forth. It is noted that, as described herein, the technique 700 may be optional for a given process 108.

As mentioned above, it is possible that a powerful adversary may spoof, or mimic, the heartbeat 230 that is provided by the process monitor 106. Therefore, in accordance with example implementations, measures are employed to allow the baseboard management controller 170 to authenticate messages that appear to be "heartbeat messages," i.e., messages that correspond to heartbeat indications, or pings, of the heartbeat 230. One of many types of authentication schemes may be used, depending on the particular implementation.

For example, in accordance with some implementations, the process monitor 106 may generate a heartbeat 230 by generating a message that includes a message header that represents that the message is a "heartbeat message," and also includes a count value, which may be used to authenticate the messages as actually being a heartbeat message. The count value may be generated by, for example, a monotonically increasing counter that increments by a predetermined increment value. The baseboard management controller 170 may also include a monotonically increasing counter that increments by the same predetermined increment value. The process monitor 106 and the baseboard management controller 170 may synchronize the initial count values stored by their counters, so that the two counters operate in lock step. In this manner, to send a given heartbeat message to the baseboard management controller 170, the process monitor 106 may, for example, increment its counter by the predetermined increment value to derive a count value and then include the count value in the heartbeat message. The heartbeat message may, for example, also include header information representing that the message is a heartbeat message. The baseboard management controller 170 may then (via the alert monitor 172 of FIG. 1) receive the heartbeat message and increment the counter of the baseboard management controller 170 by the predefined increment value to derive a count value. The baseboard management controller 170 may then authenticate the message by comparing this count value to the count value of the received message.

For a higher degree of security, in accordance with further implementations, the process monitor 106 and the baseboard management controller 170 may include pseudorandom generators that each generate an output based on the same polynomial function. As further described herein, an initial seed for the pseudorandom generator may be provided as inputs to both pseudorandom generators at boot of the computer platform 100. With the seed, for the first heartbeat message, the corresponding outputs of both polynomial generators are the same. Therefore, the baseboard management controller 170 may then (via the alert monitor 172 of FIG. 1) receive the first heartbeat message and compare a number embedded in the message to its pseudorandom generator's output to authenticate the message. The next output of the pseudorandom generator may be generated by, for example, applying the current output as the input. Regardless of how the inputs to the pseudorandom generators are generated, in general, both pseudorandom generators operate in lock step, so that the outputs of the pseudorandom generators may be used to send and authenticate heartbeat messages.

In accordance with further implementations, a yet higher degree of security for the heartbeat messages may involve the use of a message authentication code (MAC). In general, the MAC is a tag that may be inserted into a message and is generated based on a content of the message and a key. As described further herein, the key may be provided to both the process monitor 106 and the baseboard management controller 170 at boot of the computer platform 100 so that the MAC of a supposed heartbeat message may be used by the baseboard management controller 170 to authenticate the message.

Figure 5:
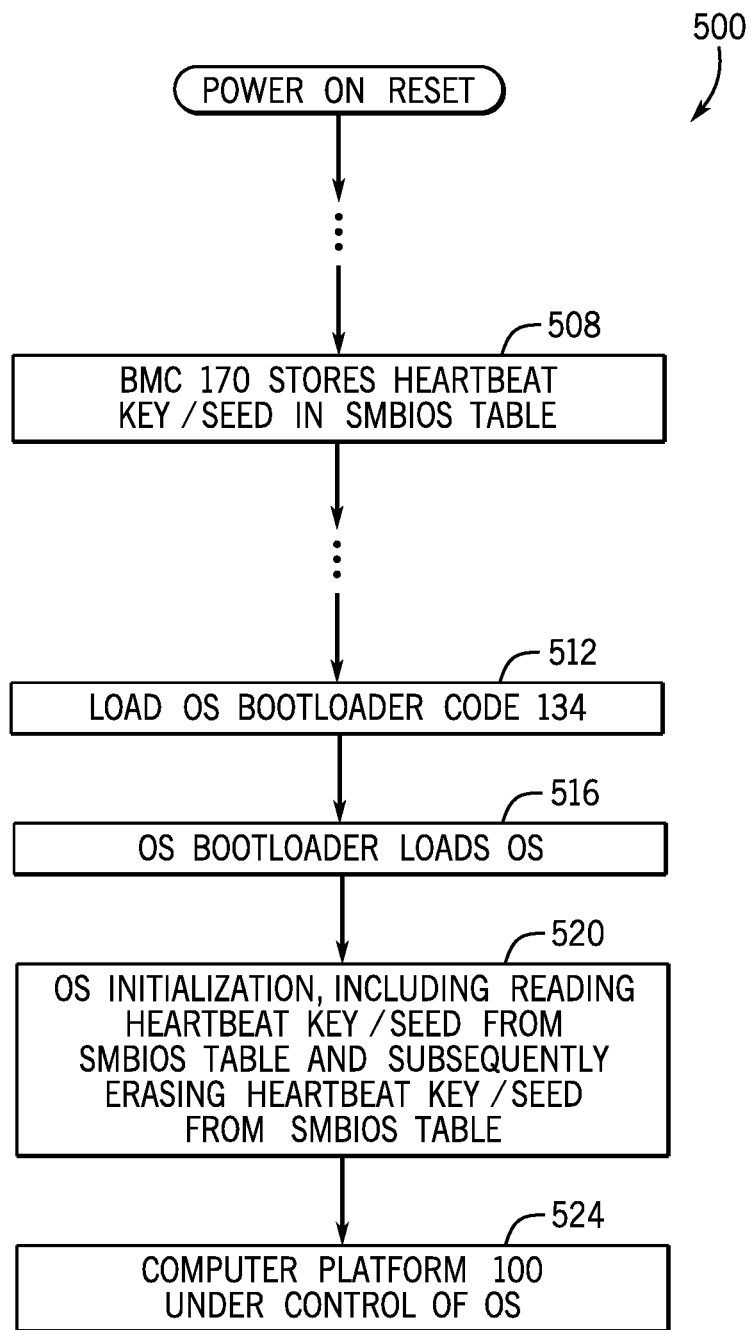
FIG. 5 is a flow diagram illustrating the passing of a heartbeat seed or key to an operating system of the computer platform according to an example implementation.

FIG. 5 depicts an example boot technique 500, illustrating how a seed or key for the heartbeat message may be distributed to the process monitor 106 as part of the boot up of the computer platform 100. For this example, the baseboard management controller 170 already has the heartbeat seed or key, as the baseboard management controller 170 stores the heartbeat seed or key in its memory (e.g., stores data representing the seed or key in the non-volatile memory 156 of the baseboard management controller 170).

Referring to FIG. 5 in conjunction with FIG. 1, as part of this boot technique 500, the baseboard management controller 170 may store (block 508) the heartbeat key or heartbeat seed in a system management basic input/output operating system (SMBIOS) table. In general, the SMBIOS table is readable by the operating system kernel 104 after the kernel 104 is loaded and initialized. The technique 500 includes loading (block 512) the operating system bootloader code 134; and consequently, the operating system bootloader loads the operating system, pursuant to block 516. As depicted at block 520, as part of the operating system initialization, the process monitor 106 reads (block 520) the heartbeat key or heartbeat seed from the SMBIOS table and erases the key/seed. The operating system then has control of the computer platform 100, as depicted in block 524.

In accordance with example implementations, when the heartbeat key is used to authenticate the heartbeat message, the operating system kernel 104 may read the heartbeat key into the kernel key ring as part of the operating system initialization. Moreover, in accordance with further implementations, the operating system bootloader may indirectly load the heartbeat key indirectly into the kernel key ring.

In accordance with further implementations, the heartbeat seed or heartbeat key may be injected into the process monitor 106 as a kernel parameter at boot time. Moreover, for these implementations, the heartbeat seed or heartbeat key may be provided to the baseboard management controller 170 using an API of the baseboard management controller 170 for adding the seed/key.

Figure 6:
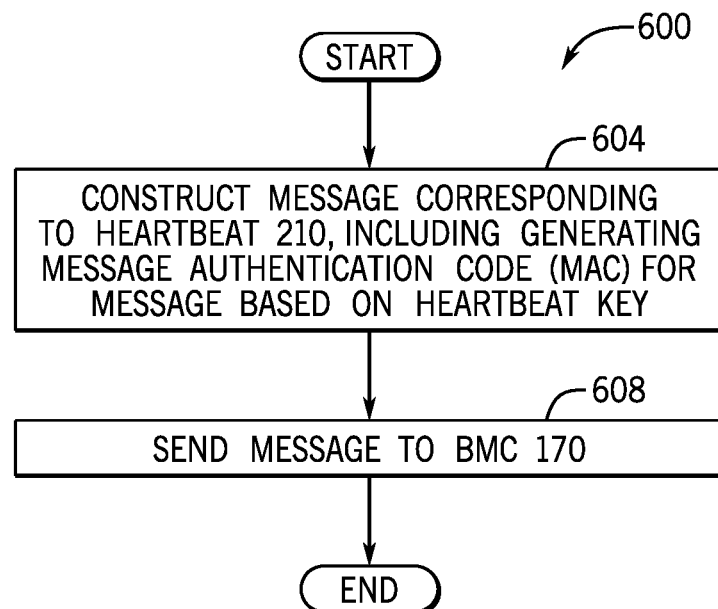
FIG. 6 is a flow diagram depicting a technique used by the process monitor to construct and send a heartbeat message to the baseboard management controller according to an example implementation.

Referring to FIG. 6 in conjunction with FIG. 1, in accordance with some implementations, the process monitor 106 may use a technique 600 for purposes of sending a message that corresponds to the heartbeat 230 (i.e., for sending a ping of the heartbeat 230). Pursuant to block 604, the process monitor 106 constructs a message corresponding to the heartbeat 230, including generating a MAC for the message based on a heartbeat key. Then, pursuant to block 608, the process monitor 106 sends the message through the baseboard management controller 170. It is noted that the technique 600 may, in accordance with example implementations, be triggered by an interrupt pursuant to a periodic schedule. In accordance with some implementations, the process monitor 106 may communicate the message to the baseboard management controller 170 over a PCIe link.

Figure 8:
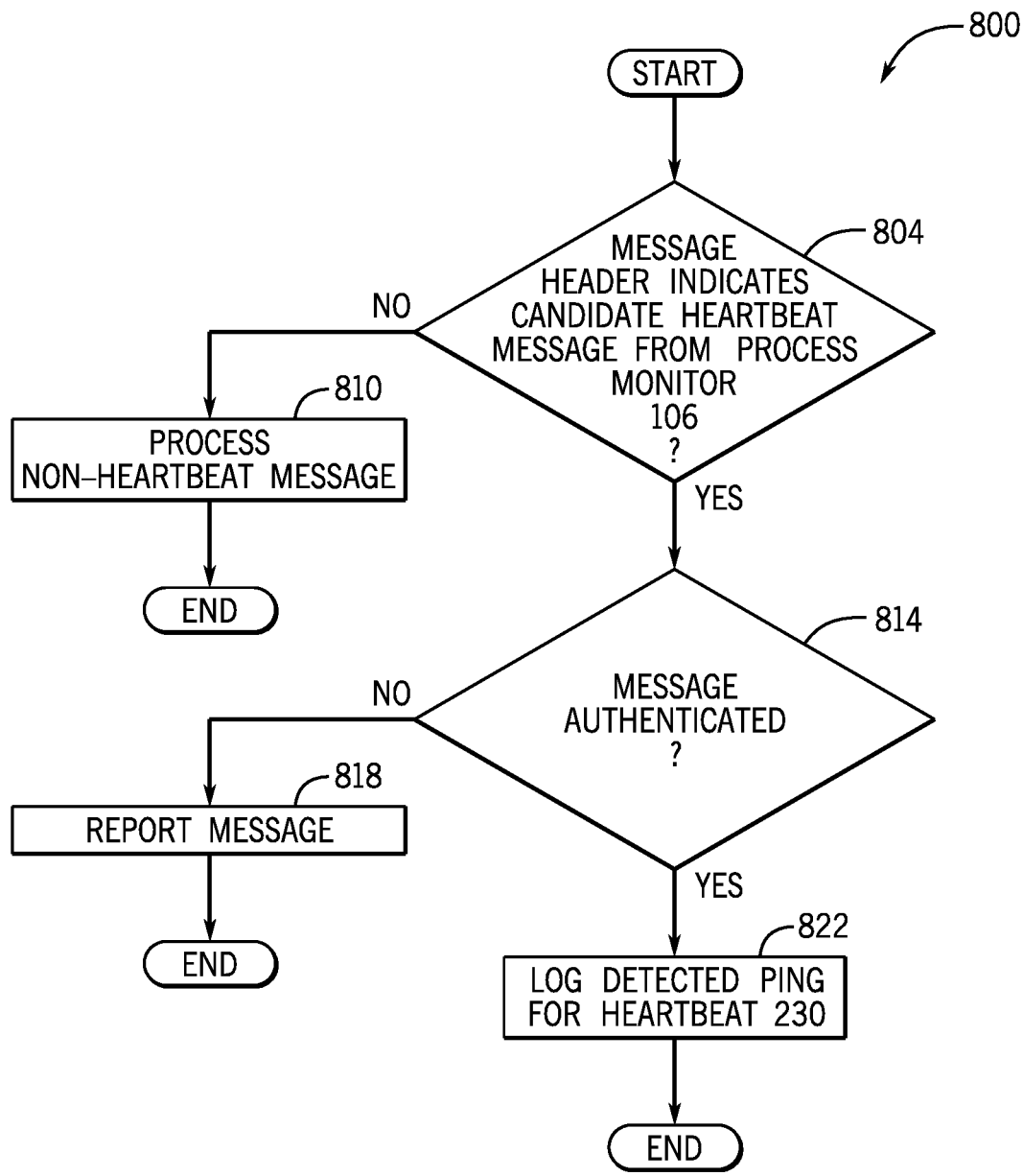
FIG. 8 is a flow diagram depicting a technique used by the baseboard management controller to authenticate heartbeat messages according to an example implementation.

FIG. 8 generally depicts a technique 800 that may be used by the alert monitor 172 (FIG. 1) of the baseboard management controller 170 to process a message having a header indicating that the message is a heartbeat message. Referring to FIG. 8 in conjunction with FIG. 1, pursuant to the technique 800, the baseboard management controller 170 determines, pursuant to decision block 804, whether the message header indicates that the candidate heartbeat message is from the process monitor 106, and if not, the baseboard management controller 170 processes the non-heartbeat message, pursuant to block 810. Otherwise, if the message header represents that the message is a heartbeat message, then the baseboard management controller 170 determines, pursuant to decision block 814, whether the message has been authenticated, and if not, reports the message, pursuant to block 818. As an example, the baseboard management controller 170 may determine if the candidate heartbeat message is authenticated based on a MAC contained in the message and a cryptographic key. If the message is authenticated, then the baseboard management controller 170 logs (block 822) the heartbeat 230, i.e., the baseboard management controller 170 logs the heartbeat ping corresponding to the authenticated heartbeat message.

Figure 9:
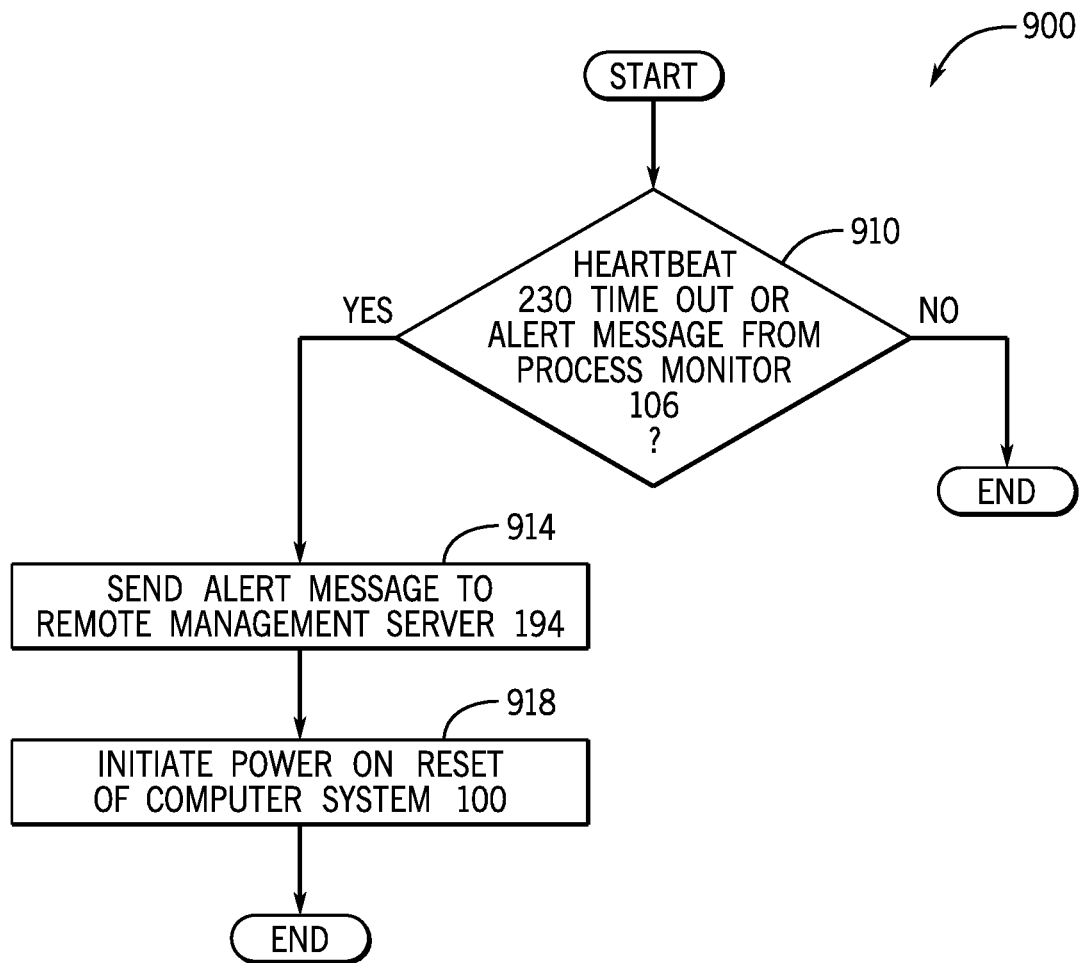
FIG. 9 is a flow diagram depicting a technique used by the baseboard management controller to respond to an alert message from the process monitor and respond to a heartbeat interruption from the process monitor according to an example implementation.

FIG. 9 depicts a technique 900 that may be used by the alert monitor 172 (FIG. 1) of the baseboard management controller 170 to periodically check (or check pursuant to another schedule) whether there is a time out of the heartbeat 230. Referring to FIG. 9 in conjunction with FIG. 1, pursuant to the technique 900, the baseboard management controller 170 determines (decision block 910) whether there is a heartbeat 230 timeout or an alert message from the process monitor 106. If so, then, pursuant to block 914, the baseboard management controller 170 sends an alert to the remote management server 194 and possibly performs one or more additional remedial actions, such as, for example, initiating (block 918) a power on reset of the computer platform 100. In accordance with further example implementations, the baseboard management controller 170 may take other and/or different remedial actions, such as, for example, locking down a subsequent boot of the computer platform 100 until authorized by appropriate credentials, and so forth.

Other variations are contemplated, which are within the scope of the appended claims. For example, in accordance with further implementations, the process monitor 106 may send the heartbeat 230 (FIG. 2) and any alerts 240 to a hardware controller other than a baseboard management controller, such as, a graphics processing unit (GPU), a network processor, or a microcontroller that does not provide management services for the computer platform 100. In accordance with further implementations, the key or seed for the heartbeat 230 may be stored in a secure memory other than a memory of the baseboard management controller 170. For example, the key or seed may be stored in a memory of the TPM 188 (FIG. 1). In accordance with further implementations, the baseboard management controller 170 may not contain a hardware root of trust and may not validate the firmware 176. In accordance with further implementations, the kernel space memory scanning by the process monitor 106 may scan for information other than information pertaining to shared library objects and COW executable pages.

Moreover, in accordance with further implementations, the kernel space memory scanning by the process monitor 106 may not involve scanning for suspicious shared library objects and may not involve scanning for COW executable pages; and aspects of the scanning may be, in accordance with example implementations, selected as part of the registration of a process for the scanning.

Although example references to the Linux operating system are made herein, in accordance with further implementations, the computer platform 100 may have an operating system (e.g., a Windows NT operating system) other than a Linux operating system, and for these implementations, the computer platform 100 may have an appropriate operating system extension corresponding to the process monitor 106.

User space processes other than processes related to security-related processes may be monitored and thus, may be monitored user space processes 108 monitored by the process monitor 106, in accordance with example implementations. For example, the monitored user space processes 108 may include processes related to container instantiations, container provisioning, and so forth. In accordance with some implementations, the baseboard management controller 170 may obtain a policy for the computer platform 100; and a monitoring interface for the baseboard management controller 170 may allow the identities of the monitored user space processes 108 to be remotely observed, thereby allowing the list of monitored user space processes 108 to be updated over time and allow a customer to verify that a particular process is being monitored. Moreover, in accordance with some implementations, the baseboard management controller 170 may provide a monitoring alert and reporting interface that may be examined using, for example, a web graphical user interface (GUI), a Redfish API, a Simple Network Management Protocol (SNMP), and so forth.

Figure 10:
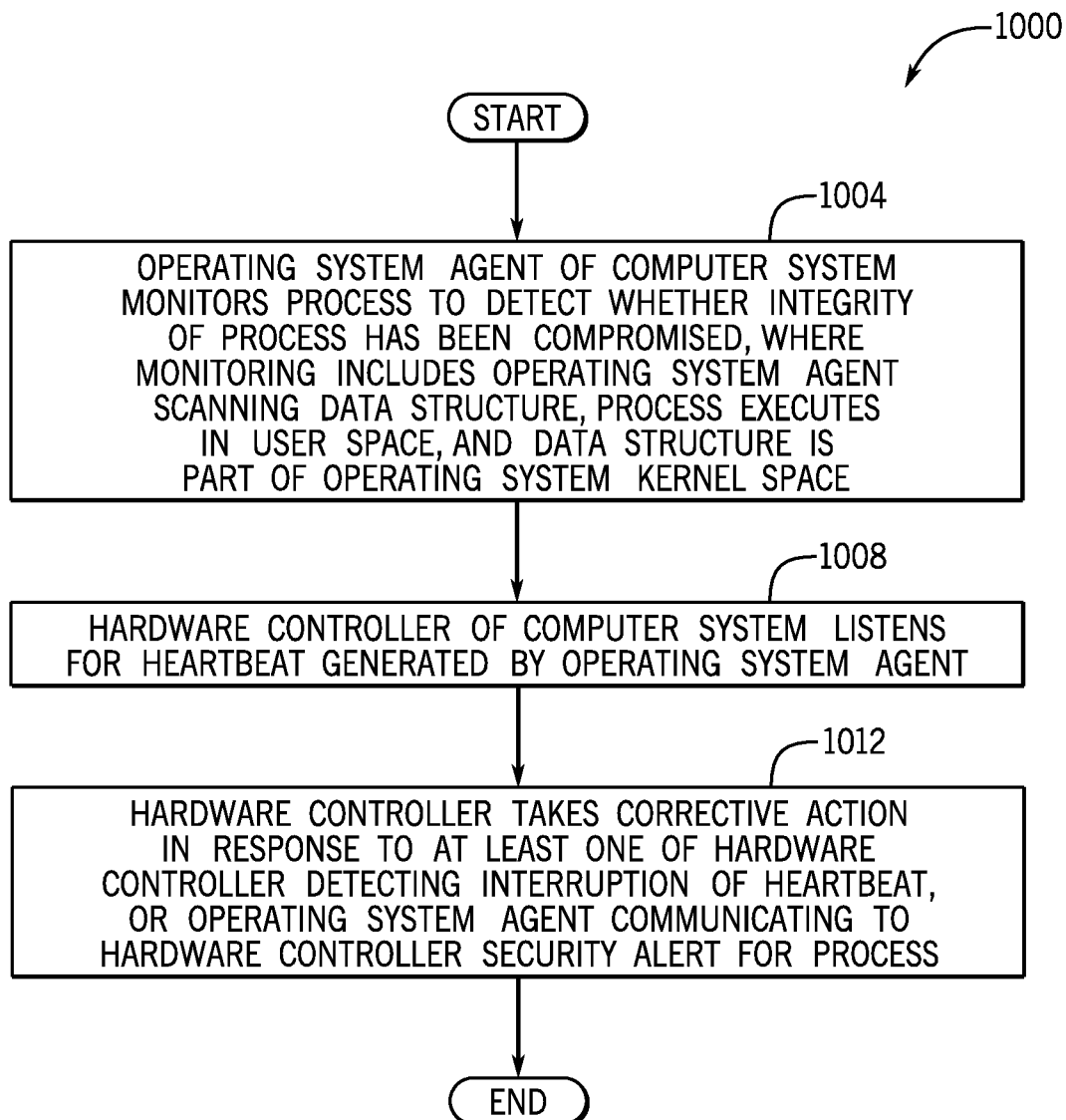
FIG. 10 is a flow diagram depicting a technique to monitor a user space process using an operating system agent and a hardware controller according to an example implementation.

Referring to FIG. 10, in accordance with example implementations, a technique 1000 includes an operating system agent of a computer system monitoring (block 1004) a process to detect whether an integrity of the process has been compromised. The monitoring includes the operating system agent scanning a data structure. The process executes in a user space, and the data structure is part of an operating system kernel space. The technique 1000 includes a hardware controller of the computer system listening (block 1008) for a heartbeat that is generated by the operating system agent. Moreover, the technique 1000 includes the hardware controller taking (block 1012) a corrective action in response to at least one of the hardware controller detecting an interruption of the heartbeat, or the operating system agent communicating to the hardware controller a security alert for the process.

Figure 11:
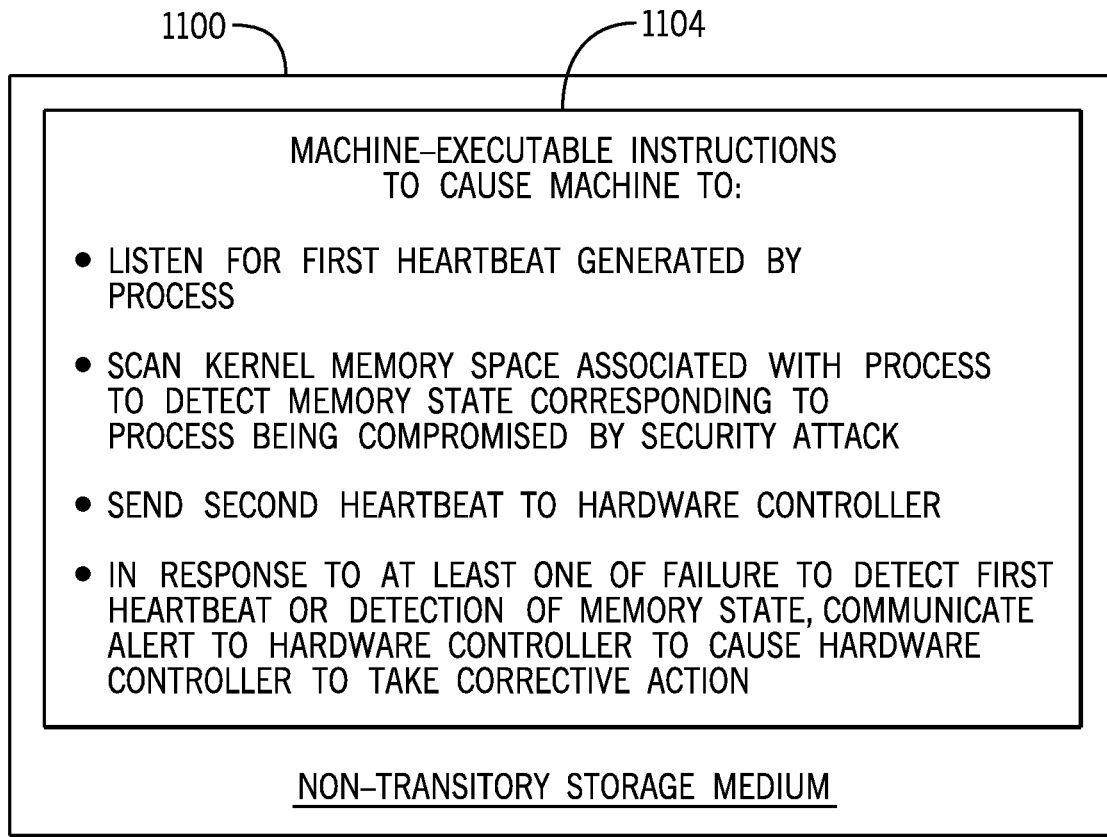
FIG. 11 is an illustration of a non-transitory storage medium that stores machine-readable instructions to cause a machine to monitor a process according to an example implementation.

Referring to FIG. 11, a non-transitory storage medium 1100 stores machine-readable instructions 1104 that, when executed by a machine, cause the machine to scan a kernel memory space associated with a process to detect a memory state corresponding to the process being compromised by a security attack. The instructions 1104, when executed by the machine, further cause the machine to send a first heartbeat to a hardware controller; and in response to detection of the memory state, communicate an alert to the hardware controller to cause the hardware controller to take corrective action.

Figure 12:
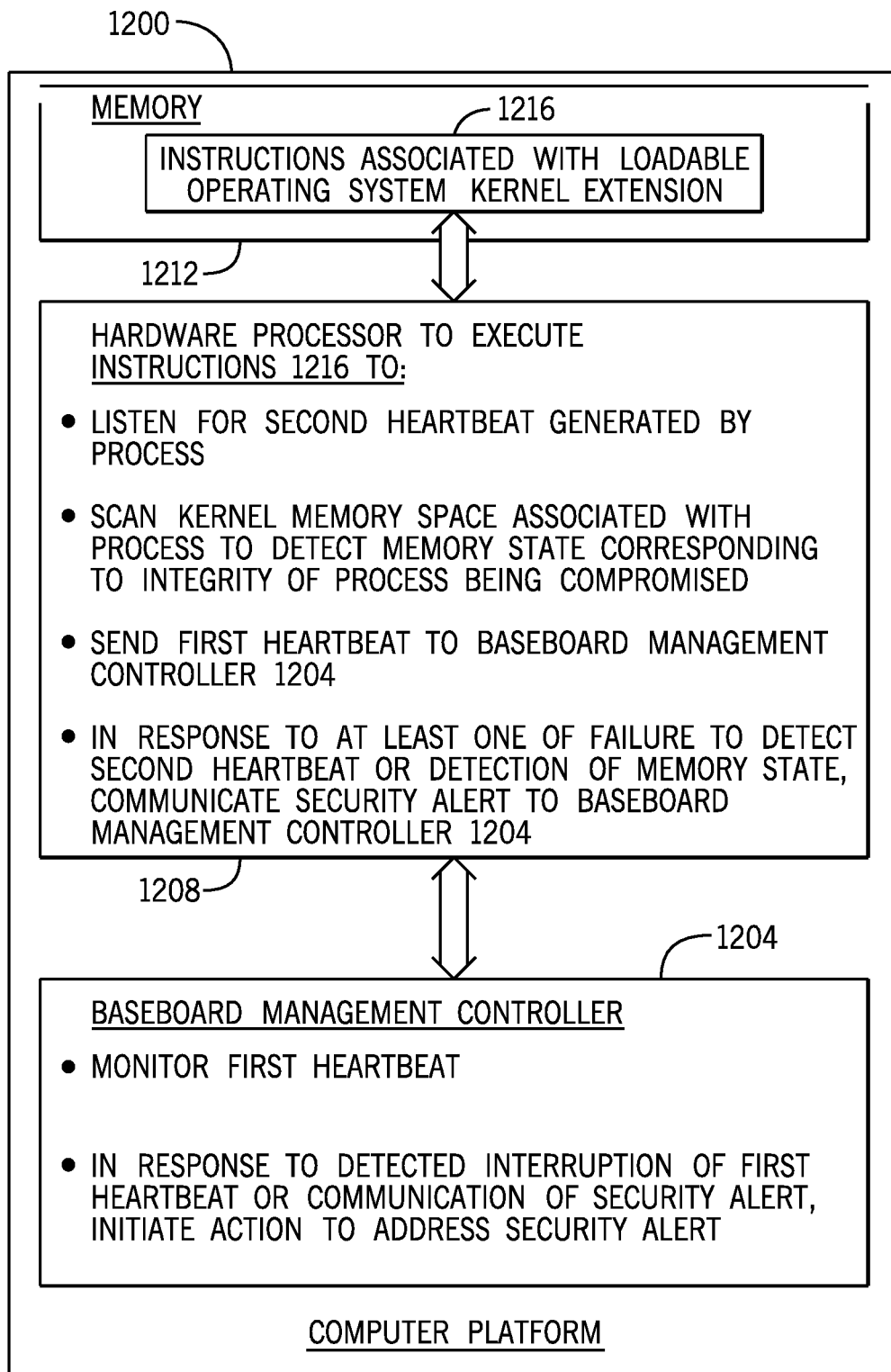
FIG. 12 is a schematic diagram depicting a computer platform that uses an operating system kernel extension and a baseboard management controller to monitor a process according to an example implementation.

Referring to FIG. 12, a computer platform 1200 includes a baseboard management controller 1204; a hardware processor 1208; and a memory 1212 that stores instructions 1216. The baseboard management controller 1204 is to monitor a first heartbeat that is provided by a loadable operating system kernel extension; and in response to a detected interruption of the first heartbeat or a communication of a security alert from the operating system kernel module, initiate an action to address the security alert. The instructions 1216, when executed by the hardware processor 1208, cause the hardware processor 1208 to listen for a second heartbeat that is generated by the process; scan a kernel memory space associated with the process to detect a memory state corresponding to an integrity of the process being compromised; and send the first heartbeat to the baseboard management controller 1204. The instructions 1216, when executed by the hardware processor 1208, cause the hardware processor 1208 to, in response to at least one of a failure to detect the second heartbeat or the detection of the memory state, communicate the security alert to the baseboard management controller 1204.

In accordance with example implementations, an application registers the process with the operating system agent, and the operating system agent begins the monitoring of the process in response to the registration. A particular advantage is that applications may select processes to be monitored.

In accordance with example implementations, the registering includes the application enabling heartbeat monitoring of the process by the operating system agent. A particular advantage is that the memory scanning without heartbeat monitoring may be used for legacy applications that do not support providing a heartbeat.

In accordance with example implementations, the hardware controller taking the corrective action includes at least one of the hardware controller initiating a reboot of the computer system, or the hardware controller communicating a security alert to a management server. A particular advantage is that remedial action may be taken in real time or near real time in response to detected malware activity.

In accordance with example implementations, the hardware controller listens for the heartbeat by receiving a message from the operating system agent and determining whether the message represents the heartbeat based on a predetermined seed or key being associated with the heartbeat. A particular advantage is that adversaries may be prevented from spoofing the heartbeat.

In accordance with example implementations, in a pre-operating system environment of the computer system, the hardware controller stores the predetermined seed or key in a system management basic input output system (SMBIOS) table; the operating system agent reads the predetermined seed or key from the SMBIOS table; and the predetermined seed or key is erased from the SMBIOS table. A particular advantage is that a certain degree of security is provided for communicating the predetermined key or seed to the operating system agent.

In accordance with example implementations, in response to an initialization of an operating system of the computer system, the retrieved seed or key is injected into a key ring of the operating system. A particular advantage is that a higher degree of security is used to protect the seed or key from being accessed by an adversary.

In accordance with example implementations, an application may communicate the predetermined key or seed to the operating system agent as a kernel parameter; and the predetermined seed or key may be communicated to the hardware controller using an application programming interface (API). A particular advantage is that boot firmware is not modified to provide the seed or key.

In accordance with example implementations, in response to a registration of the process with a heartbeat monitoring option, a heartbeat generated by the process is monitored. To detect this heartbeat, an alert is communicated to the hardware controller to cause the hardware controller to take corrective action. A particular advantage is that the heartbeat provides another way to monitor whether the integrity of a process has been compromised.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
monitoring, by an operating system agent of a computer system, a process to detect whether an integrity of the process has been compromised, wherein the operating system agent is part of an operating system kernel, wherein a kernel memory space associated with the process stores code corresponding to the operating system kernel, and wherein the monitoring comprises;
scanning, by the operating system agent, the kernel memory space to identify a shared library object; and
determining, by the operating system agent, whether the integrity of the process is compromised based on a property of the shared library object;
providing, by the operating system agent, a heartbeat, wherein the heartbeat comprises a sequence of indications following a schedule to represent that the operating system agent is operating in an acceptable state; and
initiating, by a hardware controller of the computer system, a responsive action in response to an interruption of the heartbeat.

2. The method of claim 1, further comprising:
registering, by an application, the process with the operating system agent, wherein the operating system agent begins the monitoring of the process in response to the registration.

3. The method of claim 2, wherein the registering comprises enabling, by the application, heartbeat monitoring of the process by the operating system agent.

4. The method of claim 1, wherein the initiating comprises at least one of initiating, by the hardware controller, a reboot of the computer system, or communicating, by the hardware controller, a security alert to a management server.

5. The method of claim 1, further comprising;
listening, by the hardware controller, for the heartbeat, wherein the listening comprises:
receiving a message from the operating system agent; and
determining whether the message represents the heartbeat based on a predetermined seed or a predetermined key being associated with the heartbeat.

6. The method of claim 5, further comprising:
in a pre-operating system environment of the computer system, storing, by the hardware controller, the predetermined seed or the predetermined key in a system management basic input output system (SMBIOS) table;
reading, by the operating system agent, the predetermined seed or the predetermined key from the SMBIOS table; and
erasing the predetermined seed or the predetermined key from the SMBIOS table.

7. The method of claim 5, further comprising:
in response to initialization of an operating system of the computer system, injecting the predetermined seed or the predetermined key into a key ring of the operating system.

8. The method of claim 5, further comprising:
communicating, by an application, the predetermined seed or the predetermined key to the operating system agent as a kernel parameter; and
communicating the predetermined seed or the predetermined key to the hardware controller using an application programming interface (API).

9. A non-transitory storage medium that stores machine-readable instructions that, when executed by a machine, cause the machine to:
cause an operating system agent to monitor a process to detect whether an integrity of the process has been compromised, wherein the operating system agent is part of an operating system kernel, wherein a kernel memory space associated with the process stores code corresponding to the operating system kernel, and wherein the monitoring comprises scanning, by the operating system agent, the kernel memory space to detect an executable copy-on-write page; and
cause the operating system agent to send a heartbeat to a hardware controller, wherein the heartbeat comprises a sequence of indications following a schedule to represent that the operating system agent is operating in an acceptable state.

10. The storage medium of claim 9, wherein the instructions, when executed by the machine, further cause the machine to:
in response to a registration of the process with a heartbeat monitoring option, listen for an additional heartbeat generated by the process; and
in response to a failure to detect the additional heartbeat, communicate an alert to the hardware controller to cause the hardware controller to initiate a responsive action.

11. The storage medium of claim 9, wherein the instructions, when executed by the machine, further cause the machine to generate an alert responsive to the detection of the executable copy-on-write page.

12. The storage medium of claim 11, wherein the instructions, when executed by the machine, further cause the machine to determine that a memory page of the kernel memory space corresponds to the executable copy-on-write page based on at least one status flag associated with the memory page.

13. The storage medium of claim 9, wherein the instructions, when executed by the machine, further cause the machine to:
cause the operating system agent to scan the kernel memory space to detect a memory state corresponding to the process being compromised by a security attack;
identify a given shared library object associated with the process and a path associated with the given shared library object;
compare the given shared library object to a reference list of a plurality of approved shared library objects and file paths associated with the plurality of approved shared library objects; and
determine whether the memory state corresponding to the process being compromised by a security attack has been detected based on the comparison.

14. A computer platform comprising:
a processor to:
execute instructions to cause the processor to provide an operating system agent to monitor a process to detect whether an integrity of the process has been compromised, wherein the operating system agent is part of an operating system kernel, wherein a kernel memory space associated with the process stores code corresponding to the operating system kernel, and wherein the monitoring comprises:
scanning, by the operating system agent, the kernel memory space to identify a given shared library object; and
determining, by the operating system agent, whether the integrity of the process is compromised based on a property of the given shared library object;
provide a heartbeat, wherein the heartbeat comprises a sequence of indications following a schedule to represent that the operating system agent is operating in an acceptable state; and
a controller independent from the operating system agent to:
monitor the heartbeat; and
initiate a responsive action in response to an interruption of the heartbeat.

15. The computer platform of claim 14, wherein the instructions, when executed by the processor, further cause the processor to:
scan the kernel memory space to detect a memory state corresponding to an integrity of the process being compromised; and
use the scanning to determine whether the process has been subjected to at least one of process hollowing or code injection.

16. The computer platform of claim 14, wherein the process comprises one of a plurality of processes, and the instructions, when executed by the processor, further cause the processor to:
listen for a plurality of heartbeats generated by the plurality of processes; and
in response to a detected interruption of a given heartbeat of the plurality of heartbeats, communicate a security alert to the controller.

17. The computer platform of claim 14, wherein:
the given shared library object is a member of a plurality of shared library objects associated with the process; and
the instructions, when executed by the processor, further cause the processor to:
determine the plurality of shared library objects and for each shared library object of the plurality of shared library objects, determine a file path of the shared library object; and
communicate the plurality of shared library objects and the file paths to the controller; and
the controller to communicate the plurality of shared library objects and the file paths to a remote management server.

18. The computer platform of claim 14, wherein the instructions, when executed by the processor, further cause the processor to generate messages corresponding to the heartbeat based on a predetermined seed or key shared with the controller.

19. The computer platform of claim 14, wherein the property comprises a path associated with the given shared library object and the instructions, when executed by the processor, further cause the processor to:
compare the given shared library object to a reference list of a plurality of approved shared library objects and file paths associated with the plurality of approved shared library objects; and
determine that the integrity of the process is compromised based on the comparison.

20. The method of claim 1, further comprising:
detecting, by the hardware controller, tampering with the operating system agent responsive to the interruption of the heartbeat.

21. The method of claim 1, further comprising:
installing an operating system corresponding to the operating system kernel in the computer system, wherein the installing comprises loading a kernel module corresponding to the operating system agent to extend the operating system kernel.

22. The computer platform of claim 14, wherein the controller comprises a management controller to provide management services for the computer platform.

23. The computer platform of claim 22, wherein the management controller comprises a baseboard management controller.

24. The method of claim 1, wherein:
the property comprises a file path of the shared library object; and
determining whether the integrity of the process is compromised comprises:
  comparing the file path to a reference list of file paths associated with a plurality of approved shared library objects; and
  determining that the integrity of the process is compromised based on the comparison.

* * * * *